United States Patent [19]

Kawada et al.

[11] Patent Number: 5,439,777
[45] Date of Patent: Aug. 8, 1995

[54] RECORDING AND REPRODUCING APPARATUS AND METHOD FOR APPLYING A PULSE VOLTAGE AND AN ELECTROMAGNETIC WAVE

[75] Inventors: Haruki Kawada, Yokohama; Hiroshi Matsuda, Isehara; Kiyoshi Takimoto, Kawasaki; Hiroyasu Nose, Zama, all of Japan

[73] Assignee: Canon Kabushiki Kaisha, Tokyo, Japan

[21] Appl. No.: 19,344

[22] Filed: Feb. 18, 1993

Related U.S. Application Data

[63] Continuation of Ser. No. 416,380, Oct. 3, 1989, abandoned.

[30] Foreign Application Priority Data

Oct. 4, 1988 [JP] Japan .................................. 63-251455
Dec. 1, 1988 [JP] Japan .................................. 63-302223

[51] Int. Cl.⁶ ......................... G01N 23/00; G11B 7/00
[52] U.S. Cl. ...................................... 430/270; 430/19; 430/495; 430/945; 365/112; 365/114; 250/306; 369/126
[58] Field of Search ................ 430/19, 495, 270, 945; 346/150, 158; 365/112, 114, 118, 174, 151; 250/306; 257/40; 369/13, 126

[56] References Cited

U.S. PATENT DOCUMENTS

| | | | |
|---|---|---|---|
| 3,833,894 | 9/1974 | Aviram et al. ......................... | 357/8 |
| 3,953,874 | 4/1976 | Aviram et al. ......................... | 357/8 |
| 4,085,455 | 4/1978 | Okumura ............................... | 365/112 |
| 4,575,822 | 3/1986 | Quate .................................... | 365/174 |
| 4,684,598 | 8/1987 | Potember et al. ..................... | 430/269 |
| 4,819,210 | 4/1989 | Miura et al. ........................... | 365/118 |
| 4,825,408 | 4/1989 | Potember et al. ..................... | 365/118 |
| 4,837,435 | 6/1989 | Sakuhara et al. ..................... | 250/306 |
| 4,839,435 | 6/1989 | Sakuhara et al. ..................... | 250/306 |
| 4,878,213 | 10/1989 | Kazan et al. ........................... | 430/31 |
| 4,907,195 | 3/1990 | Kazan et al. ........................... | 346/158 |
| 4,929,524 | 5/1990 | Sakai et al. ............................ | 430/56 |
| 4,945,515 | 7/1990 | Ooumi et al. .......................... | 365/174 |
| 4,960,679 | 10/1990 | Nakagiri et al. ...................... | 430/335 |
| 4,962,480 | 10/1990 | Ooumi et al. .......................... | 365/151 |
| 4,969,978 | 11/1990 | Tomita et al. ......................... | 250/306 |
| 5,051,977 | 9/1991 | Goldberg .............................. | 369/126 |
| 5,072,116 | 10/1991 | Kawade et al. ....................... | 250/306 |
| 5,161,147 | 11/1992 | Goldberg et al. ..................... | 369/126 |

FOREIGN PATENT DOCUMENTS

| | | |
|---|---|---|
| 729650 | 3/1966 | Canada .................................. 357/8 |
| 0073304 | 3/1983 | European Pat. Off. . |
| 0238759 | 9/1987 | European Pat. Off. . |
| 0272935 | 6/1988 | European Pat. Off. . |
| 1-116941 | 5/1989 | Japan .................................. 365/151 |
| 8403169 | 8/1984 | WIPO . |

OTHER PUBLICATIONS

*IBM Technical Disclosure Bulletin*, vol. 32, No. 2, Jul. 1989, pp. 285–286. "Information Storage with Scanning Tunneling Microscope".

*Primary Examiner*—Charles L. Bowers, Jr.
*Assistant Examiner*—Martin J. Angebranndt
*Attorney, Agent, or Firm*—Fitzpatrick, Cella, Harper & Scinto

[57] ABSTRACT

A recording-reproducing apparatus includes an electrode, a material that changes its intramolecular electron distribution upon the application of electromagnetic wave irradiation and an electric field provided on the electrode, and an electrically conductive probe having a pointed tip. The apparatus projects an electromagnetic wave onto the material, and applies a pulse voltage between the electrode and the conductive probe.

17 Claims, 6 Drawing Sheets

PROBE-POSITION-CONTROLLING SIGNAL

FIG. 4B

ELECTROMAGNETIC WAVE SOURCE-CONTROLLING SIGNAL

FIG. 4C

ERASING SIGNAL

FIG. 4D

DETECTED TUNNEL CURRENT

INITIAL STATE

FIG. 5A

LIGHT IRRADIATION

FIG. 5B

LIGHT IRRADIATION
& ELECTRIC FIELD APPLICATION

FIG. 5C

WRITTEN STATE

FIG. 5D

WRITTEN STATE

FIG. 6A

LIGHT IRRADIATION

FIG. 6B

LIGHT IRRADIATION & REVERSE ELECTRIC FIELD APPLICATION

FIG. 6C

ERASED STATE (INITIAL STATE)

FIG. 6D

RECORDING AND REPRODUCING APPARATUS AND METHOD FOR APPLYING A PULSE VOLTAGE AND AN ELECTROMAGNETIC WAVE

This application is a continuation of application Ser. No. 07/416,380 filed Oct. 3, 1989, now abandoned.

BACKGROUND OF THE INVENTION

1. Field of the Invention

The present invention relates to a recording-reproducing apparatus for recording by employing electromagnetic wave irradiation arid electric field application and reproducing by detecting a tunnel current, and a recording-reproducing method employing the apparatus. And the present invention relates to further a novel recording medium used suitably for the recording and reproducing method.

2. Related Background Art

Applications of memory materials are the most important field of electronic industries such as computors and related apparatus, video-disks, and digital audiodisks. The developement of the materials are the subject of comprehensive studies in recent years. Although the performances required to the memory materials depend on the application fields thereof, the generally required performances are as below:

(1) High recording density and large recording capacity, (2) High response speed of recording and reproduction, (3) Low electric power consumption, and (4) High productivity and low cost. and so forth.

Heretofore, semiconductor memories and magnetic memories based on a semiconductor or a magnetic substance are predominantly used for memory materials. Lately as a result of the progress of laser technology, low-cost and high-density recording media have been developed employing an optical memory by use of an organic thin film of an organic coloring matter, a photopolymer, etc.

On the other hand, the scanning tunnelling microscope (hereinafter referred to as STM) has been recently developed to enable a direct observation of an electronic structure of surface atoms or molecules of a conductor with a resolving power of 0.1 nm [G. Binnig et al., Phys. Rev. Lett. 49 (1982) 57]. Recently, by using STM, an experiment has been conducted in which a pulse voltage is applied between a probe electrode and an electroconductive material to fabricate locally the surface of the electroconductive material and the change of the shape or state of the surface is read [J. S. Foster et al., Nature 331 (1988) 324]. Further by means of the STM, switching characteristics and rectification characteristics of an organic molecule have been investigated [A. Aviram et al., Chem. Phys. Lett. 146 (1988), 490].

However, even with the highest density and the largest recording capacity of the conventional optical memories practically used, the recording capacity is at most $10^8$ bit/cm, which is becoming insufficient to the image recording in modern computors and video apparatuses.

The recording and reproduction by use of STM, although the recording can be conducted with a bit size in the order of an interatomic or intermolecule distance (0.5 to 50 nm), is not satisfactory from the viewpoint of the reproductivity and stability, and yet its recording and erasing mechanism has not been elucidated. Moreover, in measurement of electric characteristics by accessing a molecule by means of STM, the record may sometimes be affected by reproducing operation (voltage application) because recording and reproduction are made by voltage application. Therefore STM is not satisfactory for application to memory.

SUMMARY OF THE INVENTION

The object of the present invention is to 1 provide a recording-reproducing apparatus satisfactory in reproductivity and stability of recording, and has a large recording capacity, and also to provide a method for recording and reproducing employing the apparatus. And the object of the present invention is to provide a novel recording medium used suitably for the recording and reproducing method.

The above object is achieved by the present invention described below.

According to an aspect of the present invention, there is provided a recording-reproducing apparatus, comprising a material, in which intramolecular electron distribution can be changed, by electromagnetic irradiation and electric field application, a probe electrode brought close to the material, a means for projecting an electromagnetic wave onto the material, and a means for applying an electric field between the material and the probe electrode.

According to another aspect of the present invention, there is provided a recording-reproducing apparatus, comprising a recording, in which a material selected from the group of compounds consisting of azo compounds, styrene derivatives and imino compounds having a quinone group and hydroquione group in the molecule, and azo compounds, styrene derivatives and 1 imino compounds having two amino groups in the molecule is deposited on an electrode; a probe electrode brought close to the recording medium; a means for projecting an electromagnetic wave onto the recording medium; and a means for applying electric field between the recording medium and the probe electrode.

According to still another aspect of the preseent invention, there is provided a recording-reproducing apparatus, comprising a recording medium, in which a charge transfer complex is deposited on an electrode, a probe electrode brought close to the recording medium, a means for projecting light onto the recording medium, and a means for applying electric field between the recording medium and the probe electrode.

According to a further aspect of the present invention, there is provided a recording method comprising projecting an electromagnetic wave and simultaneously applying electric field onto a material, in which intramolecular electron distribution can be changed, by electromagnetic wave projection and electric field application to cause change in the electron distribution in the molecule of the material to write information, thereby conducting information-recording.

According to a still further aspect of the present invention, there is provided a recording-reproducing method, comprising conducting information-recording by projecting an electromagnetic wave and simultaneously applying electric field onto a material, in which intramolecular electron distribution can be changed, by electromagnetic wave projection and electric field application thereby causing change in the electron distribution in the molecule of the material to write information; and conducting information readout by detecting a tunnel current at the portion where the information is recorded.

According to a still further aspect of the present invention, there is provided a recording-reproducing-erasing method, comprising conducting information-recording by projecting an electromagnetic wave and simultaneously applying electric field onto a material, in which intramolecular electron distribution can be changed, by electromagnetic wave projection and electric field application thereby causing change in the electron distribution in the molecule of the material to write information; conducting information readout by detecting a tunnel current at the portion where the information is recorded; and erasing the information by projecting an electromagnetic wave and simultaneously applying electric field onto the portion where the information is recorded.

According to still further aspect of the present invention, there is provided a recording-reproducing-erasing method, comprising conducting information-recording by projecting an electromagnetic wave and simultaneously applying electric field onto a material, in which intramolecular electron distribution can be changed, by electromagnetic wave projection and electric field application thereby causing change in the electron distribution in the molecule of the material to write information; conducting information readout by detecting a tunnel current at the portion where the information is recorded; and erasing the information by introducing a vibration energy to the portion where the information is recorded.

According to still further aspect of the present invention, there is provided a recording medium, comprising providing a material capable of causing a proton-transfer by photoisomerization on a substrate.

DETAILED DESCRIPTION OF THE PREFERRED EMBODIMENTS

The present invention is described in detail below.

The materials employed in the present invention are those, in which an electron distribution in the molecule can be changed, by irradiation of an electromagnetic wave and application of voltage.

Embodiment of the materials includes (1) memory materials, in which a redox pair (an oxidation-reduction pair) within the molecule or between the molecules is formed due to isomerization in the molecular structure by electomagnetic wave irradiation, and an electron distribution in the molecule is changed due to proton transfer in the redox pair by further electric field application, and (2) memory materials, in which an molecular distribution in the molecule is changed, by irradiation with electomagnetic wave and simultaneous application of an electric voltage exceeding the threshold voltage for causing memory effect.

Embodiment (1) of the memory materials includes specifically azo compounds having a quinone group and a hydroquinone group within the molecule, styrene derivatives having a quinone group and a hydroquinone group within the molecule, imino compounds having a quinone group and a hydroquinone group within the molecule, azo compounds having two amino groups within the molecule, styrene derivatives having two amino groups within the molecule, and imino compounds having two amino groups within the molecule. Examples of the preferred compounds are shown below:

No.1

No.2

No.3

No.4

No.5

No.6

(In the formulae, $R_1$–$R_5$ are $CH_3$, $C_2H_5$, or isopropyl, and the positions of =O, or —OH are in the relation of ortho, meta, or para positions.)

Compounds of Nos. 1, 2, 4 and 5 among them are particularly preferred because of a high photoisomerication efficiency.

By use of these materials, the recording/reproducing/erasing are conducted as follows.

The electromagnetic wave irradiation onto the material causes isomerization in the molecular structure, forming a redox pair in the molecule, and further application of voltage causes proton transfer within the redox pair, resulting in change in intramolecular electron distribution into the recorded state of the present invention.

Erasing is conducted by irradiation of electromagnetic wave onto the recorded portion and simultaneous application of electric field in the reverse direction to cause reversed proton transfer.

In a non-irradiated state, application of an electric field onto the material does not cause the proton transfer and the resulting change of intramolecular electron distribution since no redox pair is present. Thus, in the memory material employed here, recording and erasing can be conducted by voltage application only under irradiation of an electromagnetic wave. In reproduction, since the material is not irradiated, no change occurs in recorded and erased states by application of an electric field between the memory material and the probe for tunnel current detection.

Embodiment (2) of the memory materials includes charge transfer complexes of a metal with an organic electron acceptor. Specific examples are, for example, n-octadecyltetracyanoquinodimethan copper complex (ODTCNQ/Cu), n-dodecyltetracyanoquinodimethan copper complex (DDTCNQ/Cu), n-octadecyltetracyanoquinodimethan silver complex (ODTCNQ/Ag), n-dodecyltetracyanoquinodimethan silver complex (DDTCNQ/Ag), and their derivatives.

By employing these materials, the recording/reproduction/erasing are conducted as follows.

Recording is conducted by applying to a probe electrode a voltage exceeding a threshold voltage for giving a memory effect corresponding to the information while irradiating an electromagnetic wave (or light); reproduction is conducted by applying a voltage to the probe electrode, and scanning the material with the probe electrode keeping a constant distance between the material and the probe electrode, and detecting the change of intensity of current flowing the probe electrode; and erasing is conducted by introducing vibration energy to the material.

Such memory material is used by depositing it on an electrode material.

As the electrode material, any material may be used which is capable of forming a film having electroconductivity and smoothness. Examples of suitable materials are Au/Pd, Pt, $n^+$-Si, ITO, etc.

A preferable method for depositing a memory material onto an electrode is the Langmuir-Blodgette process in view of easiness of formation of a uniform, and defectless thin film with high regularity.

For projecting an electromagnetic wave onto the memory material, any electromagnetic wave source may be employed which emits a light having a wavelength of from visible to infrared retions. Various light sources can be used as desired such as a xenon lamp, a helium-neon laser, an argon laser, a semiconductor laser, and carbon dioxide laser. The application voltage may be varied in connection with the light intensity.

Figure 1:
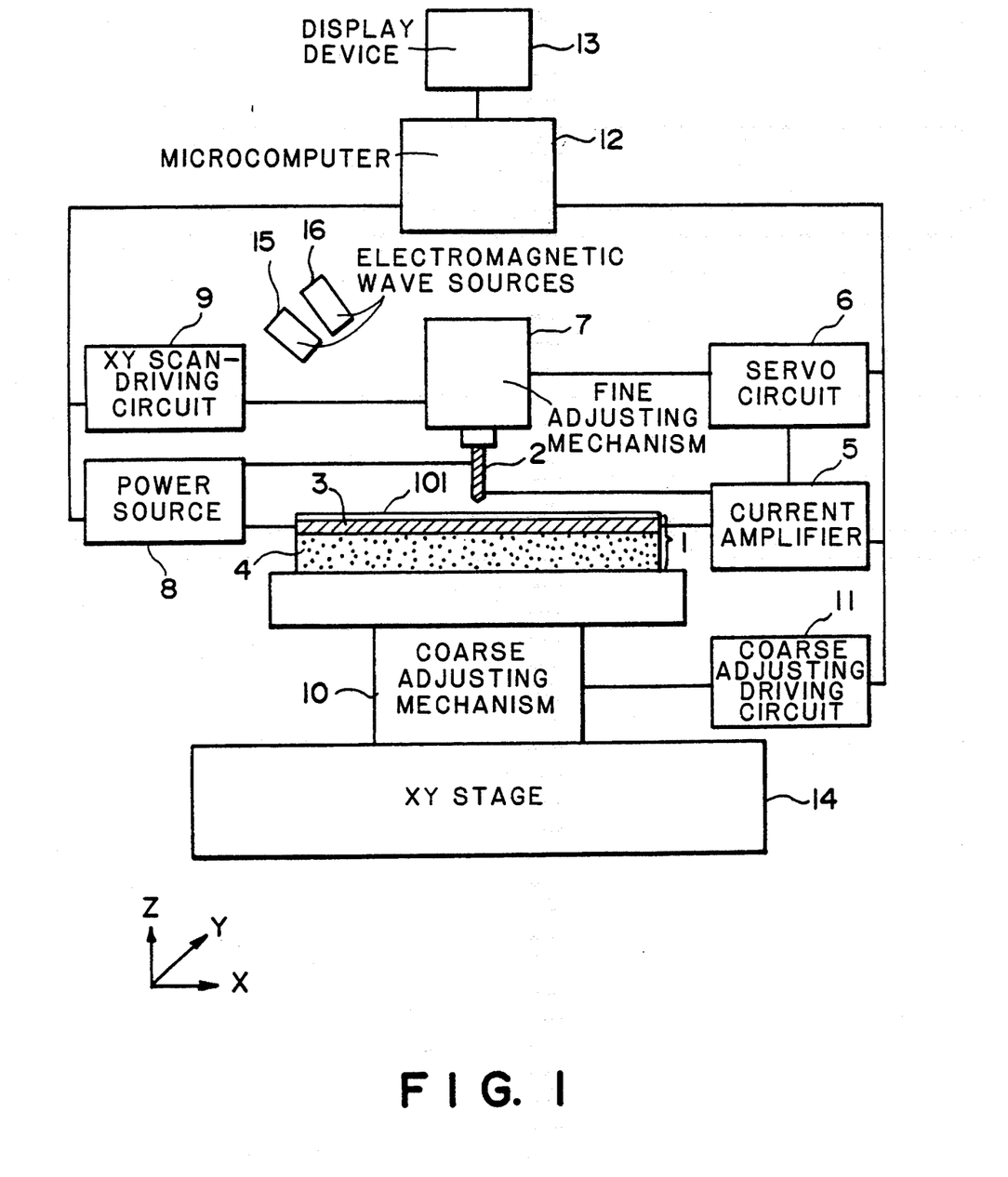
FIG. 1 illustrates a block constitution of the embodiment of a recording-reproducing apparatus of the present invention.

FIG. 1 illustrates a block constitution of a recording apparatus of the present invention, where the numeral 5 denotes a probe current amplifier; 6 denotes a servo circuit for controlling fine adjusting mechanism 7 which employs a piezo-element to maintain the probe corrent constant; and 8 denotes a power source for applying a pulse voltage between probe electrode 2 and electrode 3 for recording/erasing.

On application of a pulse voltage, the probe current abruptly changes, so that servo circuit 6 controls the HOLD circuit to be in an ON state during the change to maintain the output voltage constant.

9 is an XY scan-driving circuit for controlling the movement of probe electrode 2 in the XY directions. 10 is a coarse adjusting mechanism and 11 is a coarse adjusting-driving circuit, which coarsely control the distance between probe electrode 2 and recording medium 1 so as to give a probe current of approximately $10^{-9}$ A. These mechanisms are all subjected to central control of microcomputor 12. 13 is a display device. 14 is an XY stage. 15 and 16 are each an electromagnetic wave source.

Examples of the mechanical performances in movement control employing a piezo-element are shown below.

Range of fine movement control in the Z direction:

0.1 nm to 1 nm

Range of coarse movement control in the Z direction:

10 nm to 10 mm

Range of scanning in the XY directions:

0.1 nm to 1 nm

Tolerance in measurement and control:

less than 0.1 nm

The examples below are intended to illustrate specifically the present invention.

EXAMPLE 1

FIG. 1 illustrates a recording-reproducing apparatus of the present invention. Probe electrode 2 is made of platinum/rhodium. Probe electrode 2 is finely controlled by a piezo-element to keep the distance (Z) from the surface of recording layer 101 to maintain the current at a constant level. Fine movement control mechanism 7 is designed to control finely the movement of the probe electrode in the plane (XY) direction with retention of the distance Z. Probe electrode 2 is capable directly of recording, reproducing and erasing information. The recording medium is placed on XY stage 14 and can be moved to a desired position.

The film of octadecyltetracyanoquinodimethan copper complex (ODTCNQ/Cu) was formed in the following procedure. A solution of $4 \times 10^{-6}$ M ODTCNQ/Cu in acetonitrile (ACN) was prepared. The solution was spread on pure water at 20° C., and the surface pressure was raised to 20 mN/m to form a monomolecular film on the surface of water. A glass substrate having a vapor-deposited gold/palladium (Au/Pd) film of 300 Å thick which had been previously immersed in the water phase was slowly pulled up at a rate of 5 mm/min in the direction crossing the water surface with the surface pressure maintained constant to form a monomolecular film of ODTCNQ/Cu on the glass substrate having vapor-deposited Au/Pd. This was employed as recording medium 1.

The experiment on recording-reproducing-erasing was conducted by employing recording medium 1 having a monolayer LB film of the ODTCNQ/Cu. Firstly, recording medium 1 was placed on XY stage 14, and probe electrode 2 was fixed at a visually determined position. The distance Z between probe electrode 2 and the surface of recording layer 101 was adjusted by applying the voltage of 3 V between Au/Pd electrode 3 and the probe and by monitoring the current. On application of voltage of +300 mV to probe electrode 2, the current was found to be not more than 1 pA.

After stopping an application of the voltage, the recording was conducted by irradiating a light to recording medium 1 with xenon lamp 15 and by applying again a voltage of +5 V to probe electrode 2. The recording medium was found to have transferred to an ON state in which the electricity flowed well.

The light irradiation and the voltage application were stopped, and then at the same position, a voltage of +300 mV was applied to probe electrode 2 to reproduce the record. A current of 5 nA was found to flow there, which shows the retention of the ON state, namely the retention of the record.

After stopping an application of a voltage, argon laser 16 was projected onto the recorded portion of the material. The electromagnetic wave from argon laser 16 provided heat energy which raised the vibration energy of the molecules constituting the material and effected the erasure of the written information This electromagnetic wave had a smaller energy amount than that of an electromagnetic wave used for recording. Thereafter at the same position, a voltage of +300 mV was applied again to probe electrode 2 to reproduce the record. A current of not more than 1 pA was found to flow, which shows the transition to an OFF state, namely erasure of the record.

EXAMPLE 2

The recording-reproducing apparatus illustrated in FIG. 1 was employed in the same manner as in Example 1.

The film of dodecyltetracyanoquinodimethan copper complex (DDTCNQ/Cu) was formed in the following procedure. A solution of $4 \times 10^{-6}$ M DDTCNQ/Cu in acetonitrile (ACN) was prepared. The solution was spread on pure water at 20° C., and the surface pressure was raised to 20 mN/m to form a monomolecular film on the surface of water. A glass substrate having a vapor-deposited gold/palladium (Au/Pd) film of 300 Å thick which had been previously immersed in the water phase was slowly pulled up at a rate of 5 mm/min in the direction crossing the water surface with the surface pressure maintained constant to form a monomolecular film of DDTCNQ/Cu on the glass substrate having vapor-deposited Au/Pd. This was employed as recording medium 1.

The experiment on recording-reproducing-erasing was conducted by employing recording medium 1 having a monolayer LB film of the DDTCNQ/Cu. Firstly, recording medium 1 was placed on XY stage 14, and probe electrode 2 was fixed at a visually determined position. The distance Z between probe electrode 2 and the surface of recording layer 101 was adjusted by applying the voltage of 3 V between Au/Pd electrode 3 and the probe and by monitoring the current. On application of voltage of +300 mV to probe electrode 2, the current was found to be not more than 1 pA.

After stopping an application of the voltage, the recording was conducted by irradiating a light to recording medium 1 with xenon lamp 15 and by applying again a voltage of +5 V to probe electrode 2. The recording medium was found to have transferred to an ON state in which the electricity flows well.

The light irradiation and the voltage application were stopped, and then at the same position, a voltage of +300 mV was applied to probe electrode 2 to reproduce the record. A current of 5 nA was found to flow, which shows the retention of the ON state, namely the retention of the record.

After stopping an application of the voltage, argon laser 16 was projected onto the recorded portion and vibration energy was given thereto. Thereafter at the same position, a voltage of +300 mV was applied again to probe electrode 2 to reproduce the record. A current of not more than 1 pA was found to flow, which shows the transition to an OFF state, namely erasure of the record.

EXAMPLE 3

The recording-reproducing apparatus illustrated in FIG. 1 was employed in the same manner as in Example 1.

The film of octadecyltetracyanoquinodimethan silver complex (ODTCNQ/Ag) was formed in the following procedure. A solution of $4 \times 10^{-6}$ M ODTCNQ/Ag in acetonitrile (ACN) was prepared. The solution was spread on pure water at 20° C., and the surface pressure was raised to 15 mN/m to form a monomolecular film on the surface of water. A glass substrate having a vapor-deposited gold/palladium (Au/Pd) film of 300 Å thick which had been previously immersed in the water phase was slowly pulled up at a rate of 5 mm/min in the direction crossing the water surface with the surface pressure maintained constant to form a monomolecular film of ODTCNQ/Ag on the glass substrate having vapor-deposited Au/Pd. This was employed as recording medium 1.

The experiment on recording-reproducing-erasing was conducted by employing recording medium 1 having a monolayer LB film of the ODTCNQ/Ag. Firstly, recording medium 1 was placed on XY stage 14, and probe electrode 2 was fixed at a visually determined position. The distance Z between probe electrode 2 and the surface of recording layer 101 was adjusted by applying the voltage of 3 V between Au/Pd electrode 3 and the probe and by monitoring the current. On application of voltage of +300 mV to the probe electrode 2, the current was found to be not more than 1 pA.

After stopping an application of the voltage, the recording was conducted by irradiating a light to recording medium 1 with a helium-neon laser in place of xenon lamp 15 and applying again a voltage of +3 V to probe electrode 2. The recording medium was found to have transferred to an ON state in which the electricity flowed well.

The light irradiation and the voltage application were stopped, and then at the same position, a voltage of +300 mV was applied to the probe electrode 2 to reproduce the record. A current of 5 nA was found to flow, which shows the retention of the ON state, namely the retention of the record.

After stopping an application of the voltage, a carbon dioxide laser in place of argon laser 16 was projected onto the recorded portion and vibration energy was given thereto. Thereafter at the same position, a voltage of +300 mV was applied again to probe electrode 2 to reproduce the record. A current of not more than 1 pA was found to flow, which shows 1 the transition to OFF state, namely erasure of the record.

EXAMPLE 4

The recording-reproducing apparatus illustrated in FIG. 1 was employed in the same manner as in Example 1.

The film of octadecyltetracyanoquinodimethan silver complex (ODTCNQ/Ag) was formed in the following procedure. A solution of $4 \times 10^{-6}$ M ODTCNQ/Ag in acetonitrile (ACN) was prepared. The solution was spread on pure water at 20° C., and the surface pressure was raised to 15 mN/m to form a monomolecular film on the surface of water. An $n^+$-Si substrate which had been previously immersed in the water phase was slowly pulled up at a rate of 5 mm/min in the direction crossing the water surface with the surface pressure maintained constant to form a monomolecular film of ODTCNQ/Ag on the $n^+$-Si substrate, which was employed as recording medium 1.

The experiment on recording-reproducing-erasing was conducted by employing recording medium 1 having a monolayer LB film of the ODTCNQ/Ag. Firstly, recording medium 1 was placed on XY stage 14, and probe electrode 2 was fixed at a visually determined position. The distance Z between probe electrode 2 and the surface of recording layer 101 was adjusted by applying the voltage of 3 V between electrode ($n^+$-Si) 3 and the probe and by monitoring the current. On application of voltage of +300 mV to probe electrode 2, the current was found to be not more than 1 pA.

After stopping an application of the voltage, the recording was conducted by irradiating a light to recording medium 1 with helium-neon laser 15 and by applying again a voltage of +3 V to probe electrode 2. The recording medium was found to have transferred to an ON state in which the electricity flowed well.

The light irradiation and the voltage application were stopped, and then at the same position, a voltage of +300 mV was applied to probe electrode 2 to reproduce the record. A current of 5 nA was found to flow, which shows the retention of the ON state, namely the retention of the record.

After stopping an application of the voltage, carbon dioxide laser 16 was projected onto the recorded portion and vibration energy was given thereto. Thereafter at the same position, a voltage of +300 mV was applied again to probe electrode 2 to reproduce the record. A current of not more than 1 pA was found to flow, which shows the transition to OFF state, namely erasure of the record.

EXAMPLE 5

Figure 2:
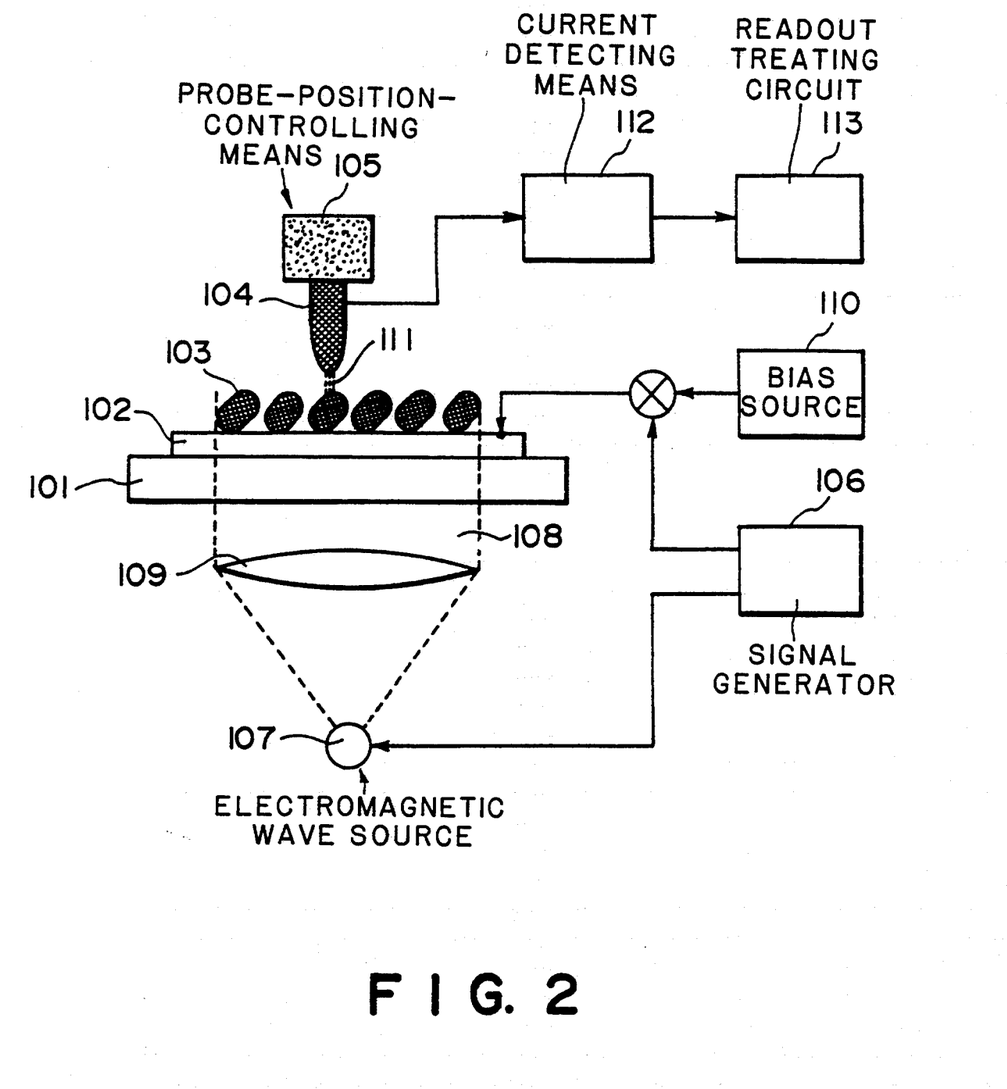
FIG. 2 illustrates a block constitution of another embodiment of a recording-reproducing apparatus of the present invention.

FIG. 2 illustrates an example of another embodiment of the present invention. In the Fig., memory material 103 (described later) is adhered by the Langmuir-Blodgette process or other method onto electroconductive transparent electrode 102 such as ITO (indium-tin oxide) provided on glass plate 101. Further probe 104 is brought to proximity of approximately sub-nanometer to the desired position of the memory material by means of a probe-position-controlling means. Probe 104 is made of an electrolytically polished tungsten wire, a mechanically cut platinum wire, or the like having a sharp tip (a radius of curvature of less than 1 682 m) and is electroconductive. Probe-position-controlling means 105 comprises such as a PTZ element and serves to move probe 104 to a desired position within a plane and the normal line direction in the memory area.

Writing/erasing is conducted in the following manner. Firstly, electromagnetic wave 108 is projected onto memory material 103 in the memory region through the glass substrate 101 and the transparent electrode by operating electromagnetic wave source 107 with lens 109 in accordance with the signal from writing/erasing signal generator 106.

Simultaneously the signal from writing/erasing singal generator 106 is sent to transparent electrode 102 to apply the electric field formed between transparent electrode 102 and probe 104 to the desired position of memory material 103, thus writing or erasing being conducted.

Figure 3A:
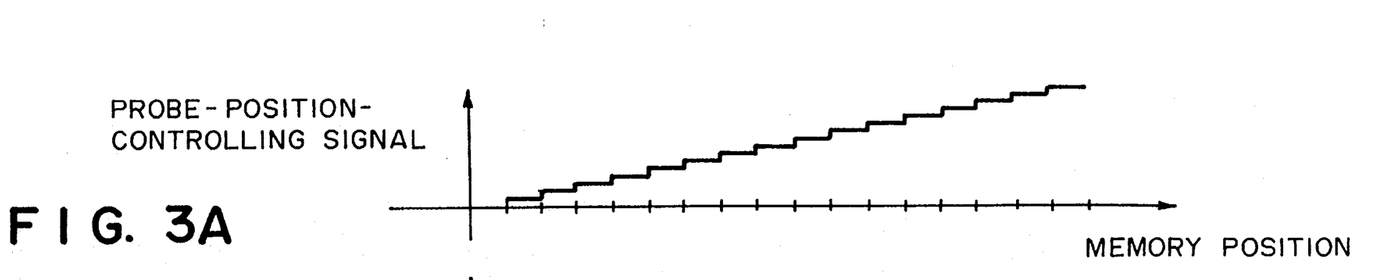
FIG. 3 illustrates an example of the signal in recording operation.
Figure 3B:
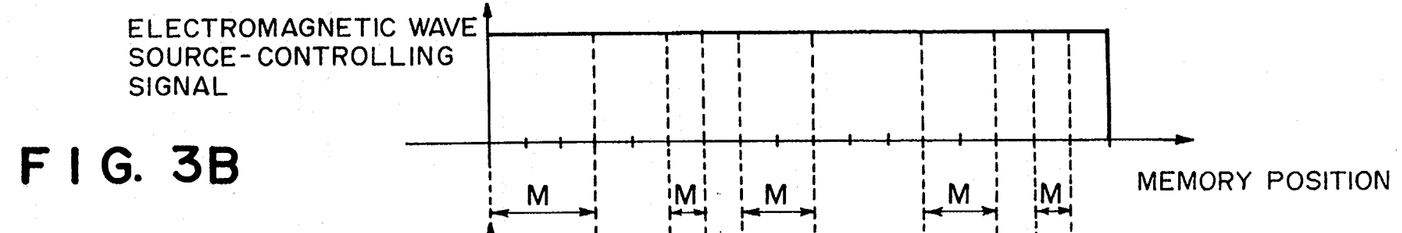
Figures 3C, 3D:
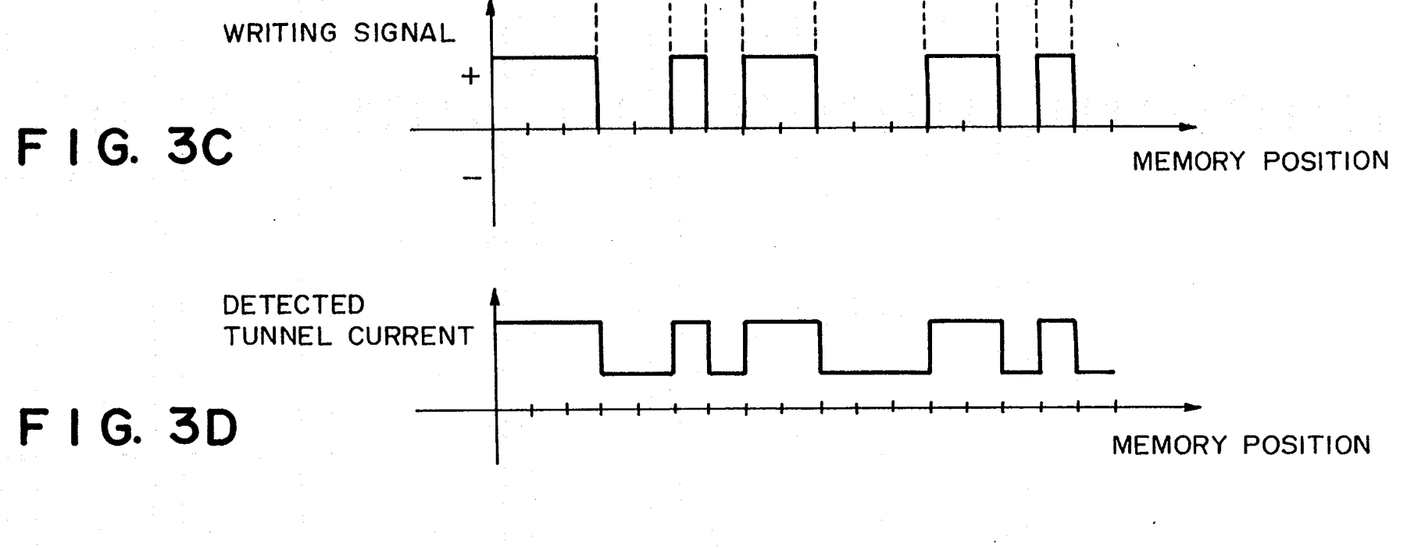

Examples of the signals in writing are shown in FIG. 3A to FIG. 3C. FIG. 3A shows a signal given to probe-position-controlling means 105, by which probe 104 accesses the desired position in the memory region. FIG. 3B shows an electromagnetic-wave-source-operating signal. FIG. 3C shows a writing signal given to the memory material. The writing is conducted at a memory position where the two signals are given simultaneously (namely region M in FIG. 3).

Figure 4A:
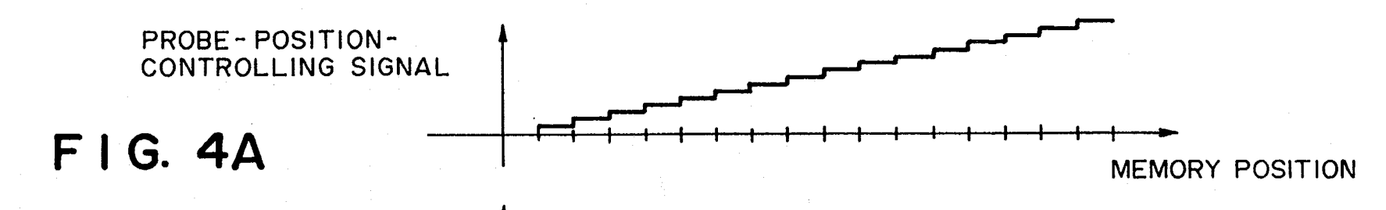
FIG. 4 illustrates an example of the signal in erasing operation.
Figures 4B, 4C:
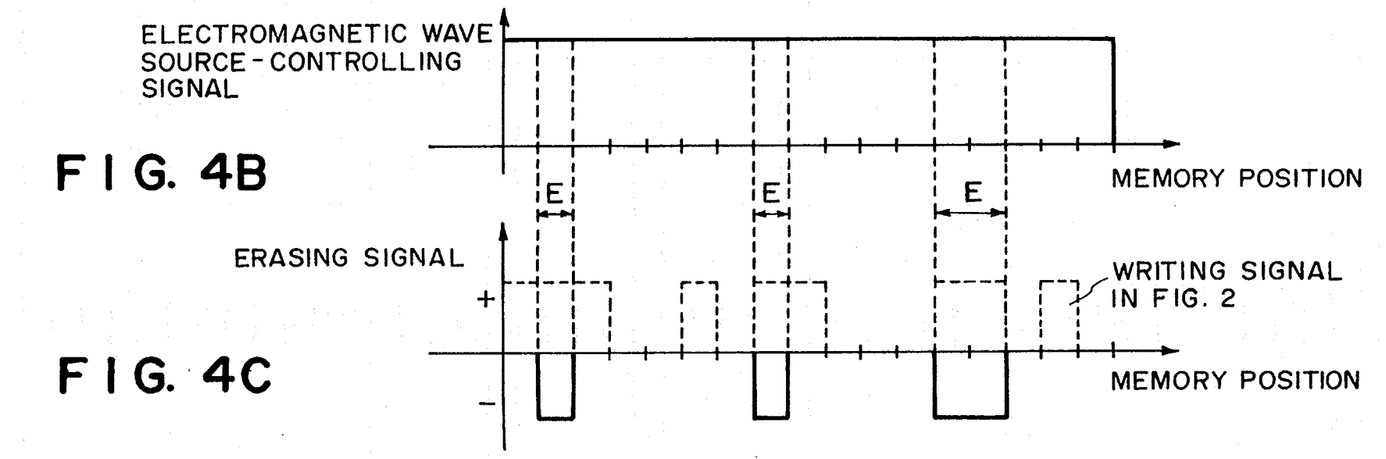

Examples of signals in erasing are shown in FIG. 4A to FIG. 4C, which illustrate erasing in the region where the writing has been conducted in the process shown in FIG. 3. FIG. 4A and FIG. 4B are the same as FIG. 3A and FIG. 3B, and FIG. 4C shows an erasing signal given to the memory material. The erasing is conducted at a memory position where the two kinds of signals are given simultaneously (namely region E in FIG. 4).

Readout is conducted in the following manner. A bias voltage is applied by bias source 110 onto the memory material on transparent electrode 102, and tunnel current 111 flowing between memory material 103 and probe 104 which is in the proximity of sub-nanometer to memory material 103 is detected by means of current detecting circuit 112. The tunnel current intensity at a written portion (being in an ON state) is different from the intensity at a non-written portion or an erased portion (being in an OFF state) on memory material 103 because the electron distribution state on the surface and the inside of the memory material is different between the two state. This difference of the tunnel current intensity is treated with readout treating circuit 113 to provide a readout signal (ON-OFF signals).

Figure 4D:
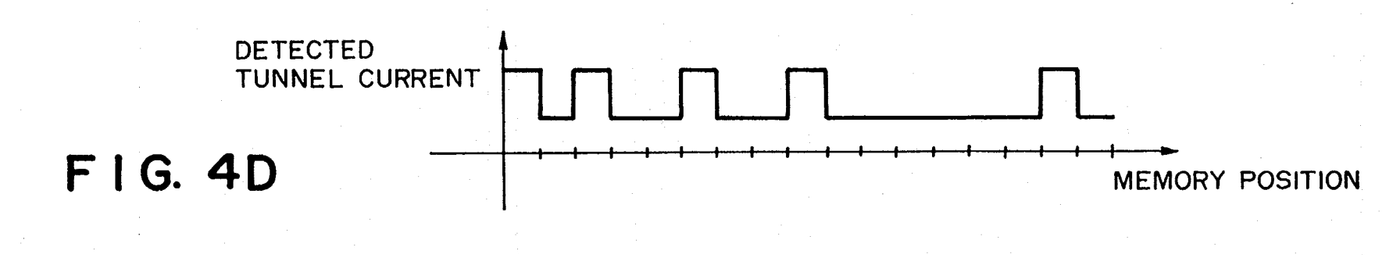

Examples of signals in readout operation are shown in FIG. 3D and FIG. 4D. FIG. 3D shows the tunnel current signal detected, after writing is conducted as described referring to FIG. 3A to FIG. 3C, by scanning again the same region. In this example, the tunnel current increases at the portions corresponding to the written portions. FIG. 4D shows the tunnel current signal detected, after erasing is conducted as described by referring to FIG. 4A to FIG. 4C, by scanning again the same region.

Figure 5A:
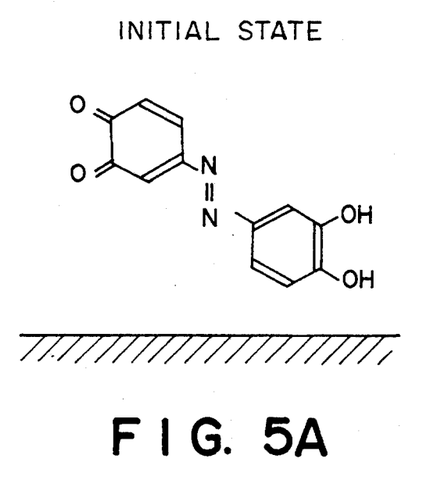
FIG. 5 shows the principle of recording by memory materials.
Figure 5B:
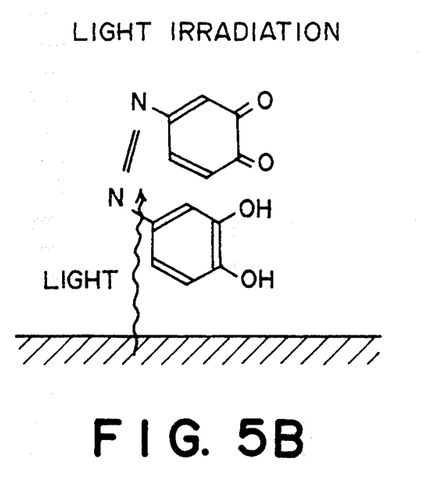
Figures 5C, 5D:
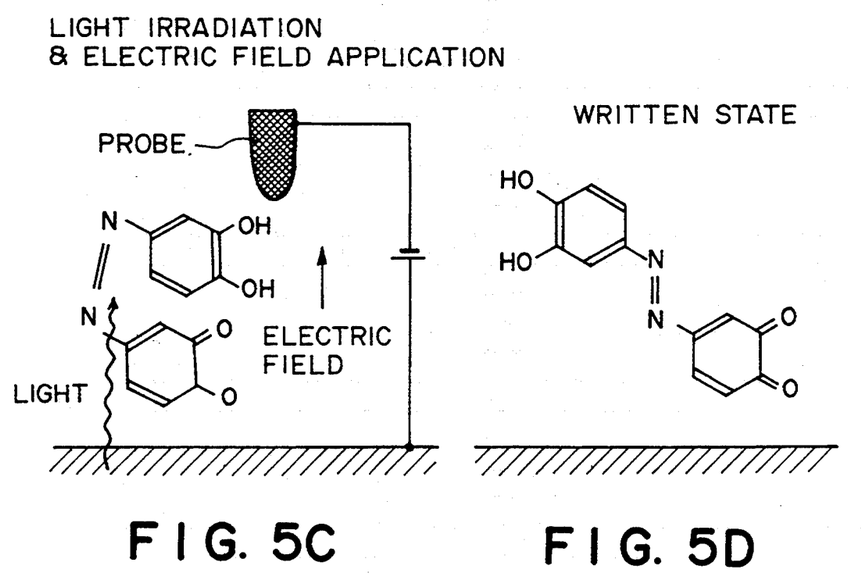

The memory material employed in the present invention and the principle of writing/erasing therein are described below. As an example of the memory material, an azo compound is taken which has the structure shown in FIG. 5A (in which the positions of the quinone groups, and the hydroquinone groups include ortho, meta, and para positions). Irradiation to the compound with light of wavelength of 400 nm causes photoisomerization from the trans configuration to the cis configuration at the azo group in the molecule to give the structure shown in FIG. 5B. With the irradiation of the light maintained, the application of an electric field between transparent electrode 102 and probe 104 in the direction as shown in the figure causes proton (H+) transfer between the quinone group and the hydroquinone group, which are in a hydrogen-bonded state, giving the structure shown in FIG. 5C. On stopping the light irradiation, a photoisomerization occurs again from the configuration to the trans configuration to give the structure shown in FIG. 5D. This structure corresponds to the written state which is different from the structure of the initial state shown in FIG. 5A in the intramolecular electron distribution and is caused by the proton transfer between the hydroquinone group and the quinone group. As the result, the shape of the tunnel barrier between transparent electrode 102 and probe 104 changes corresponding to the structure as shown in FIG. 5A (the initial state) and the structure as shown in FIG. 5D (the written state), thus giving the change of the tunnel current intensity flowing under the application of the bias voltage between transparent electrode 102 and probe 104. The detection of this change enables the discrimination of the states of the molecules (the initial state and the written state) at the position, to which probe 104 is in access. An example of the detected tunnel current signals are shown in FIG. 3D, corresponding to the instance of FIG. 3A to FIG. 3C in which the tunnel current rises at the portion in the written state in comparison with the initial state.

Figure 6A:
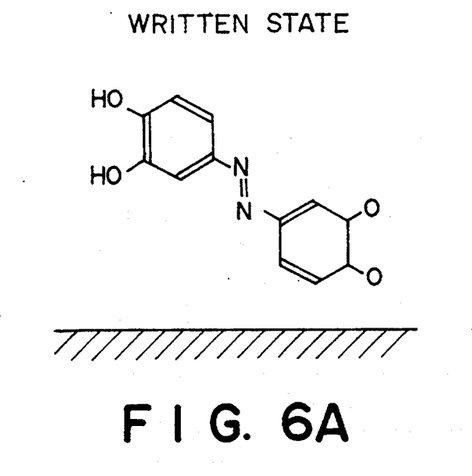
FIG. 6 shows a memory material and the principle of erasing therewith.
Figure 6B:
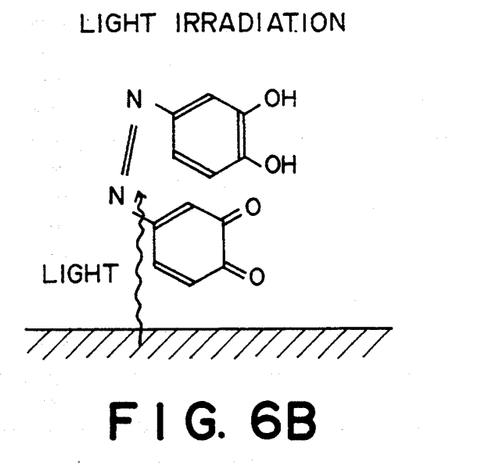
Figures 6C, 6D:
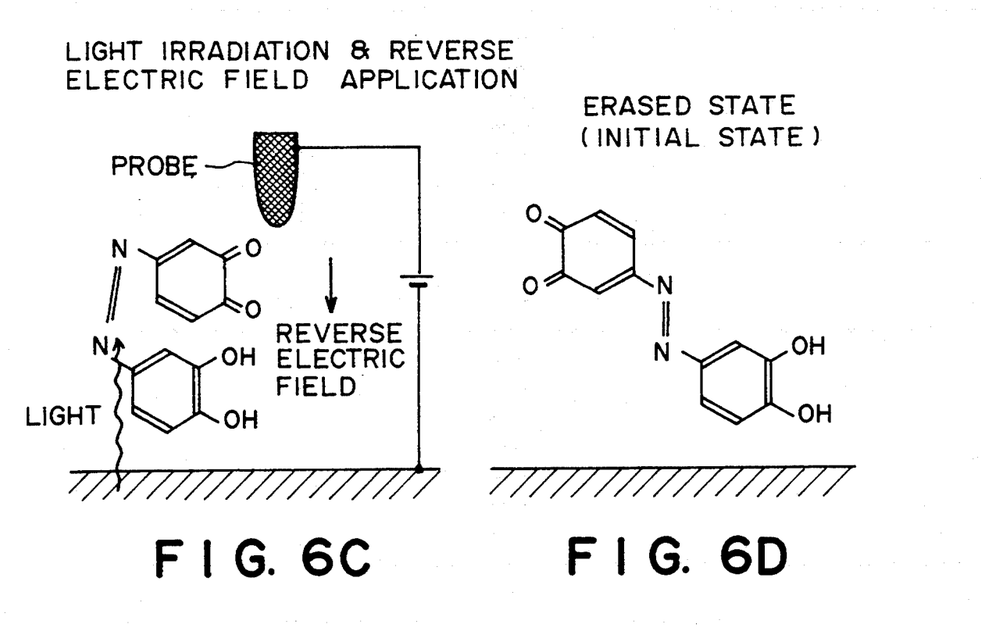

The erasing of the written state of the memory material shown in FIG. 5 is explained in reference to FIG. 6. Irradiation with light of wavelength of 400 nm onto the compound having the structure shown in FIG. 6A in a written state causes photoisomerization of the compound from the trans configuration to the cis configuration at the azo group in the molecule to give the structure shown in FIG. 6B. With the light irradiation maintained, the application of an electric field between transparent electrode 102 and probe 104 in the direction shown in FIG. 6C (in the direction reverse to that shown in FIG. 5C) causes proton (H+) transfer between the quinone group and the hydroquinone group which are in a hydrogen-bonded state, giving the structure shown in FIG. 6C. On stopping the light irradiation, the photoisomerization occurs again from the cis configuration of the trans configuration to give the structure shown in FIG. 6C. This structure corresponds to an erased state which is the same as the initial state shown in FIG. 5A. The erasing of the written state is conducted in such a manner. An example of the detected tunnel current is shown in FIG. 4D corresponding to FIG. 4A to FIG. 4C. In the position where once writing was conducted and then erasing has been conducted, the tunnel current falls to the same value as that at the initial state.

The experiments of recording-reproducing-erasing were repeatedly conducted with the memory material shown in FIG. 5 and FIG. 6 by employing the apparatus having the constitution as shown in FIG. 2 in the same manner above. The result showed that recording/erasing could be made at least approximately 100 times of repetition without deterioration of the memory material and the reproduction without causing the change of the recording-erasing state.

The memory materials employed in the present invention are those capable of undergoing photoisomerization between a trans configuration and a cis configuration (or between a syn configuration and an anti-syn configuration) on light irradiation. Such materials include those having a carbon-carbon double bond or an imino group in addition to the material 1 employed in the above examples having an azo group. The redox pair undergoing proton transfer on application of an electric field includes a hydrogen bonding system of amino group-amino group in addition to the hydrogen bonding system of quinone group-hydroquinone group employed in the above examples.

As described above, the recording-reproducing apparatus of the present invention which is based on the principle of STM can conduct recording and erasing by electromagnetic wave irradiation and electric field application on a memory material, and conduct reproduction by tunnel current detection, so that it enables a large capacity of recording and reproducing without change of record at reproduction with reproducibility and stability. With a bit size of 10 nm for the recording, a large capacity of a recording-reproducing apparatus of as large as $10^{12}$ bit/cm$^2$ is achievable.

Further, the present invention has the advantages as follows: The formation of a monomolecular film in the present invention according to an LB process can give a film having an excellent order of the molecules and a high density, which is suitable for super-high-density recording media. An erroneous writing is prevented at the time of reproduction because recording is conducted under irradiation of light. The storage stabilty is excellent because erasing of a record requires a vibration energy to be given.

We claim:

1. A recording-reproducing apparatus, comprising:
an electrode;
a material that changes its intramolecular electron distribution upon a combined application of electromagnetic wave irradiation and an electric field, said material being effected by isomerizing of molecular structure due to electromagnetic wave irradiation generating an intramolecular or intermolecular redox pair, and by proton transfer within the redox pair due to electric field application, said material being provided on said electrode;

an electrically conductive probe having a pointed tip;

means for changing a distance between said probe and said material;

means for selectively projecting an electromagnetic wave onto said material; and means for selectively applying a pulse voltage or a bias voltage between said electrode and said conductive probe;

said apparatus having first and second operative modes, wherein, in said first mode, said projecting means projects an electromagnetic wave onto said material, and said applying means selectively applies a pulse voltage in combination with the electromagnetic wave to effect a recording operation, and wherein, in said second mode, said projecting means does not project an electromagnetic wave onto said material, and said applying means applies a bias voltage to effect a reproducing operation.

2. A recording-reproducing apparatus according to claim 1, further comprising means for applying a bias voltage between said electrode and said conductive probe, and means for detecting current flowing between said electrode and said conductive probe.

3. A recording-reproducing apparatus according to claim 1, wherein said material is selected from the group consisting of azo compounds containing a quinone group and a hydroquinone group in a molecule, styrene derivatives containing a quinone group and a hydroquinone group in a molecule, imino compounds containing a quinone group and a hydroquinone group in a molecule, azo compounds having two amino groups in a molecule, styrene derivatives having two amino groups in a molecule and imino compounds having two amino groups in a molecule.

4. A recording-reproducing apparatus, comprising:
a transparent electrode;
a material that changes its intramolecular electron distribution upon a combined application of electromagnetic wave irradiation and an electric field, said material being effected by isomerizing of molecular structure due to electromagnetic wave irradiation generating an intramolecular or intermolecular redox pair, and by proton transfer within the redox pair due to electric field application, said material being provided on said transparent electrode;
an electrically conductive probe having a pointed tip;
means for changing a distance between said probe and said material;
means for selectively projecting an electromagnetic wave onto said material through said transparent electrode and
means for selectively applying a pulse voltage or a bias voltage between said transparent electrode and said conductive probe;
said apparatus having first and second operative modes, wherein, in said first mode, said projecting means projects an electromagnetic wave onto said material, and said applying means selectively applies a pulse voltage in combination with the electromagnetic wave to effect a recording operation, and wherein, in said second mode, said projecting means does not project an electromagnetic wave onto said material, and said applying means applies a bias voltage to effect a reproducing operation.

5. A recording-reproducing apparatus according to claim 4, further comprising means for applying a bias voltage between said electrode and said conductive probe, and means for detecting current flowing between said electrode and said conductive probe.

6. A recording-reproducing apparatus according to claim 4, wherein said material is selected from the group consisting azo compounds containing a quinone group and a hydroquinone group in a molecule, styrene derivatives containing a quinone group and a hydroquinone group in a molecule, imino compounds containing a quinone group and a hydroquinone group in a molecule, azo compounds having two amino groups in a molecule, styrene derivatives having two amino groups in a molecule and imino compounds having two amino groups in a molecule.

7. A recording method, comprising the steps of:
providing on an electrode a material that changes its intramolecular electron distribution upon a combined application of electromagnetic wave irradiation and an electric field, said material being effected by isomerizing of molecular structure due to electromagnetic wave irradiation generating an intramolecular or intermolecular redox pair, and by proton transfer within the redox pair due to electric field application;
bringing an electrically conductive probe having a pointed tip close to said material;
selectively projecting a first electromagnetic wave onto said material; and
selectively applying a first voltage between said electrode and said conductive probe for applying an electric field to said material when said first electromagnetic wave is projected onto said material, to change the intramolecular electron distribution, thereby to write information.

8. A recording method according to claim 7, wherein said material is selected from the group consisting of azo compounds containing a quinone group and a hydroquinone group in a molecule, styrene derivatives containing a quinone group and a hydroquinone group in a molecule, imino compounds containing a quinone group and a hydroquinone group in a molecule, azo compounds having two amino groups in a molecule, styrene derivatives having two amino groups in a molecule and imino compounds having two amino groups in a molecule.

9. A recording method according to claim 7, wherein the intramolecular electron distribution change of said material is effected by proton transfer within an intramolecular redox paid due to electromagnetic wave irradiation and electric field application.

10. A recording-reproducing method, comprising the steps of:
providing on an electrode a material that changes its intramolecular electron distribution upon a combined application of electromagnetic wave irradiation and an electric field, said material being effected by isomerizing of molecular structure due to electromagnetic wave irradiation generating an intramolecular or intermolecular redox pair, and by proton transfer within the redox pair due to electric field application;
bringing an electrically conductive probe having a pointed tip close to said material;

selectively projecting a first electromagnetic wave onto said material;

selectively applying a first voltage between said electrode and said conductive probe for applying an electric field to said material when said first electromagnetic wave is projected onto said material, to change the intramolecular electron distribution, thereby to write information; and selectively applying a second voltage between said electrode and said conductive probe when said first electromagnetic wave is not projected on said material, to detect a tunnel current flowing through said material, thereby to read out information.

11. A recording-reproducing method according to claim 10, wherein said material is selected from the group consisting of azo compounds containing a quinone group and a hydroquinone group in a molecule, styrene derivatives containing a quinone group and a hydroquinone group in a molecule, imino compounds containing a quinone group and a hydroquinone group in a molecule, azo compounds having two amino groups in a molecule, styrene derivatives having two amino groups in a molecule and imino compounds having two amino groups in a molecule.

12. A recording-reproducing method according to claim 10, wherein the intramolecular electron distribution change of said material is effected by proton transfer within an intramolecular redox pair due to electromagnetic wave irradiation and electric field application.

13. A recording-reproducing-erasing method, comprising the steps of:

providing on an electrode a material that changes its intramolecular electron distribution upon a combined application of electromagnetic wave irradiation and an electric field, said material being effected by isomerizing of molecular structure due to electromagnetic wave irradiation generating an intramolecular or intermolecular redox pair, and by proton transfer within the redox pair due to electric field application;

bringing an electrically conductive probe having a pointed tip close to said material;

selectively projecting a first electromagnetic wave onto said material;

selectively applying a first voltage between said electrode and said conductive probe for applying an electric field to said material when said first electromagnetic wave is projected onto said material, to change the intramolecular electron distribution, thereby to write information;

selectively applying a second voltage between said electrode and said conductive probe when said first electromagnetic wave is not projected on said material, to detect a tunnel current flowing through said material, thereby to read out information;

selectively projecting a second electromagnetic wave onto a written portion of said material; and selectively applying a third voltage between said electrode and said conductive probe for applying an electric field to said material when said second electromagnetic wave is projected onto the written portion, to erase said written information.

14. A recording-reproducing-erasing method according to claim 13, wherein said material is selected from the group consisting of azo compounds containing a quinone group and a hydroquinone group in a molecule, styrene derivatives containing a quinone group and a hydroquinone group in a molecule, imino compounds containing a quinone group and a hydroquinone group in a molecule, azo compounds having two amino groups in a molecule, styrene derivatives having two amino groups in a molecule and imino compounds having two amino groups in a molecule.

15. A recording-reproducing-erasing method, comprising the steps of:

providing on an electrode a material that changes its intramolecular electron distribution upon a combined application of electromagnetic wave irradiation and an electric field, said material being effected by isomerizing of molecular structure due to electromagnetic wave irradiation generating an intramolecular or intermolecular redox pair, ..and by proton transfer within the redox pair due to electric field application;

bringing an electrically conductive probe having a pointed tip close to said material;

selectively projecting a first electromagnetic wave onto said material;

selectively applying a first voltage between said electrode and said conductive probe for applying an electric field to said material when said first electromagnetic wave is projected onto the material, to change the intramolecular electron distribution, thereby to write information;

selectively applying a second voltage between said electrode and said conductive probe when said first electromagnetic wave is not projected on said material, to detect a tunnel current flowing through said material, thereby to read out information; and projecting a second electromagnetic wave onto a written portion of said material to impart heat energy to said material for raising a vibration energy of molecules constituting said material, thereby to erase said written information.

16. A recording-reproducing-erasing method according to claim 15, wherein the intramolecular electron distribution change of said material is effected by proton transfer within an intramolecular redox pair due to electromagnetic wave irradiation and electric field application.

17. A recording method according to claim 15, wherein said material is selected from the group consisting of azo compounds containing a quinone group and a hydroquinone group in a molecule, styrene derivatives containing a quinone group and a hydroquinone group in a molecule, imino compounds containing a quinone group and a hydroquinone group in a molecule, azo compounds having two amino groups in a molecule, styrene derivatives having two amino groups in a molecule and imino compounds having two amino groups in a molecule.

* * * * *

UNITED STATES PATENT AND TRADEMARK OFFICE
CERTIFICATE OF CORRECTION

PATENT NO. : 5,439,777
DATED : August 8, 1995
INVENTOR(S) : KAWADA ET AL.

It is certified that error appears in the above-indentified patent and that said Letters Patent is hereby corrected as shown below:

Title page,
At [56] U.S. PATENT DOCUMENTS

"5,072,116 10/1991 Kawade et al." should read --5,072,116 12/1991 Kawade et al.--.

Column 1

Line 13, "arid" should read --and--;
Line 16, "to further" should read --further to--;
Line 33, "cost." should read --cost--;
Line 44, "developted" should read --developed--; and
Line 61, "$10^8$ bit/cm," should read --$10^8$ bit/cm$^2$,--.

Column 2

Line 9, "1" should be deleted;
Line 36, "1" should be deleted;
Line 41, "preseent" should read --present--; and
Line 43, "medium ," should read --medium,--.

Column 3

Line 67, "an" should read --a--.

Column 7

Line 60, "information" should read --information.--.

Column 9

Line 12, "0n" should read --On--.

UNITED STATES PATENT AND TRADEMARK OFFICE
CERTIFICATE OF CORRECTION

PATENT NO. : 5,439,777
DATED : August 8, 1995
INVENTOR(S) : KAWADA ET AL.

It is certified that error appears in the above-indentified patent and that said Letters Patent is hereby corrected as shown below:

<u>Column 10</u>

Line 30, "1 682 m)" should read --1 $\mu$m)--.

<u>Column 11</u>

Line 9, "state." should read --states.--.

<u>Column 12</u>

Line 7, "On" should read --On--; and
Line 34, "1" should be deleted.

<u>Column 13</u>

Line 57, "electrode" should read --electrode; and--.

<u>Column 16</u>

Line 22, "..and" should read --and--; and
Line 51, "recording" should read --recording-reproducing-erasing--.

Signed and Sealed this

Twenty-first Day of November, 1995

Attest:

BRUCE LEHMAN

*Attesting Officer*   *Commissioner of Patents and Trademarks*